May 3, 1949. J. J. BANASZAK ET AL 2,468,914
FOLDABLE VEHICLE
Filed July 10, 1947 2 Sheets-Sheet 1
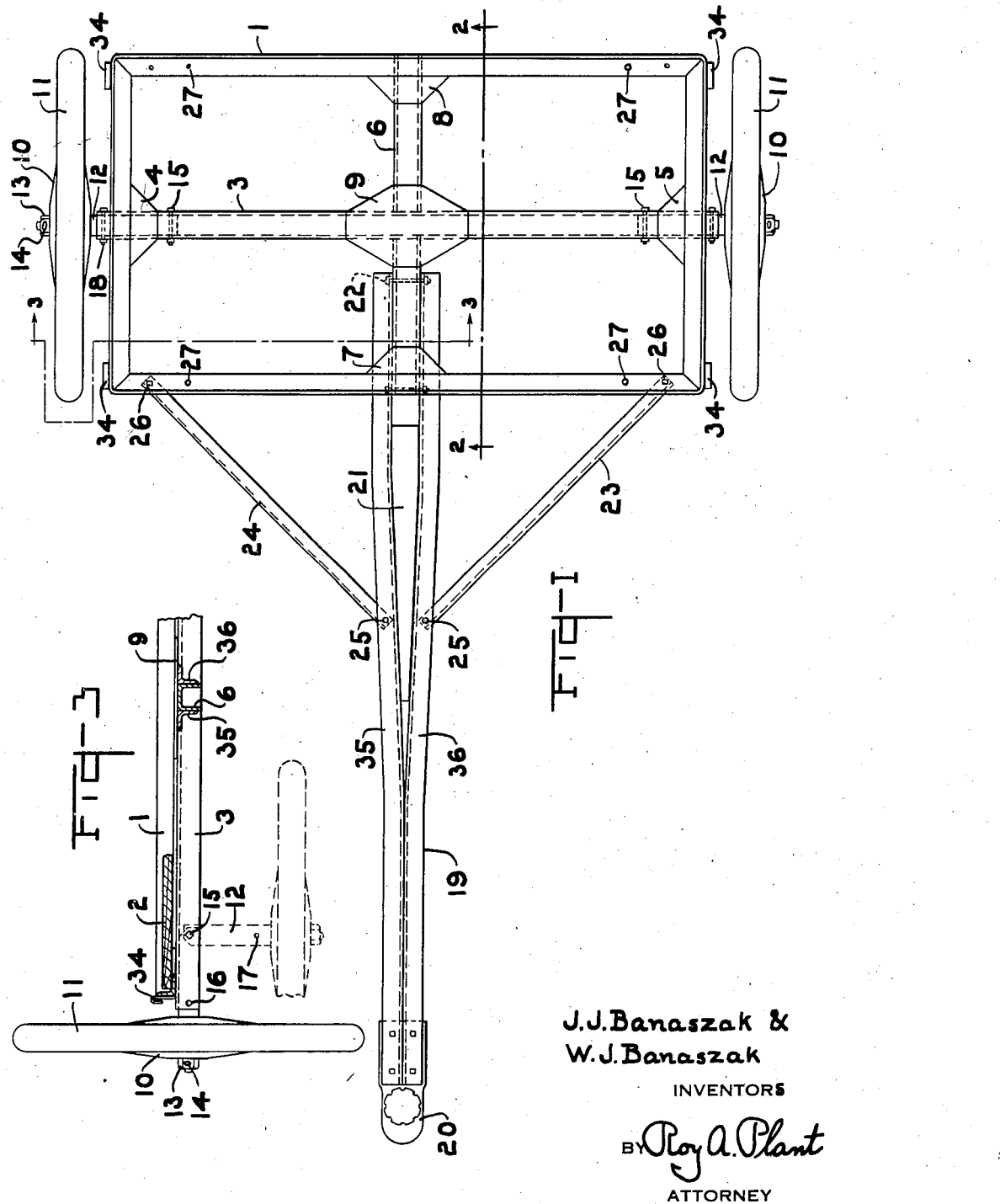
J.J. Banaszak &
W.J. Banaszak
INVENTORS
BY Roy A. Plant
ATTORNEY May 3, 1949.    J. J. BANASZAK ET AL    2,468,914
FOLDABLE VEHICLE
Filed July 10, 1947    2 Sheets-Sheet 2
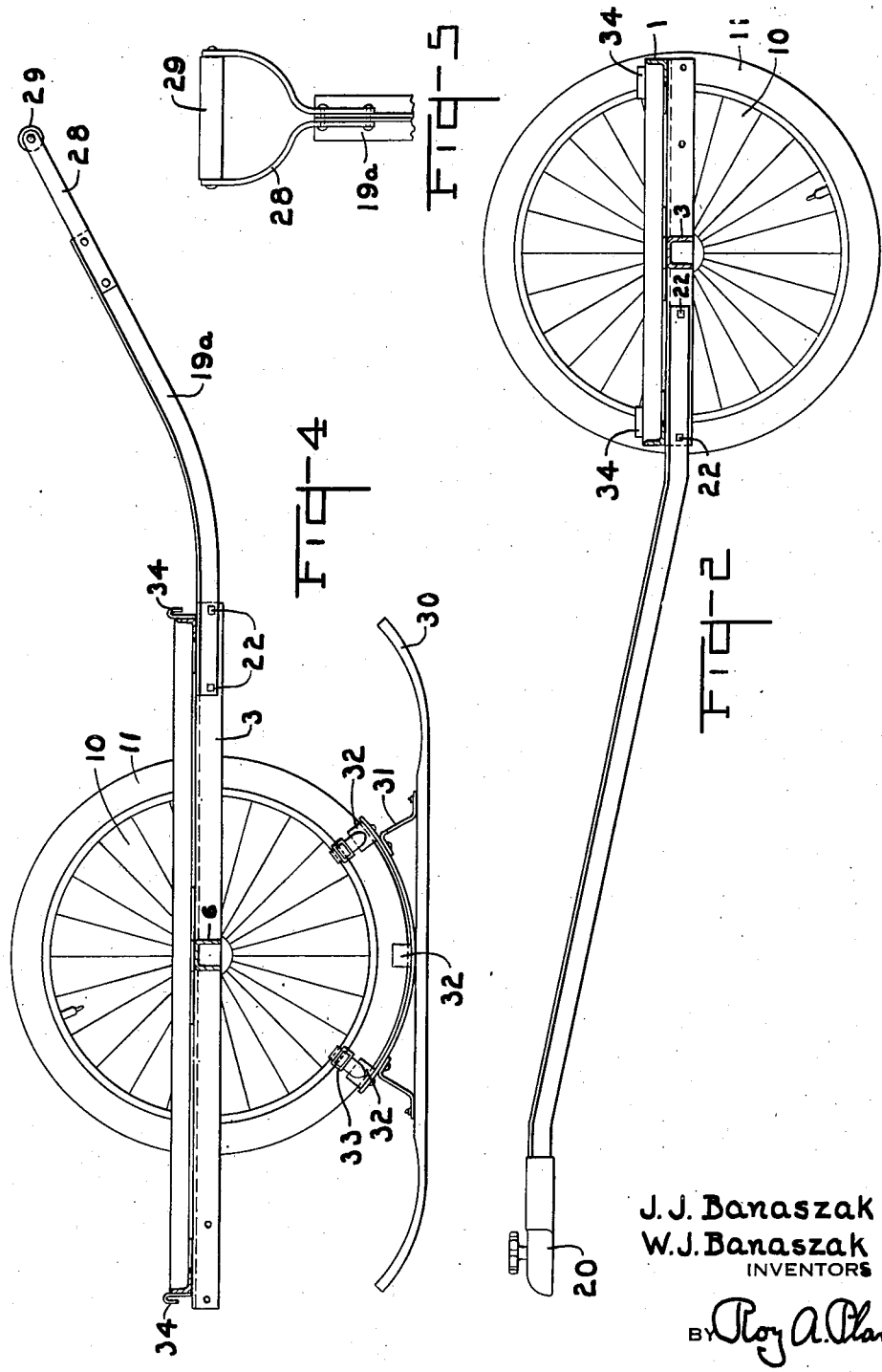
J.J. Banaszak &
W.J. Banaszak
INVENTORS
BY Roy A. Plant
ATTORNEY Patented May 3, 1949

2,468,914

UNITED STATES PATENT OFFICE 2,468,914

FOLDABLE VEHICLE

John J. Banaszak and Walter J. Banaszak, Battle Creek, Mich.

Application July 10, 1947, Serial No. 760,063

7 Claims. (Cl. 280—40)

The present invention relates broadly to wheeled vehicles, and in its specific phases to a two wheeled foldable trailer.

Wheeled vehicles, as such, are exceedingly old in the art, and even folding baby carriages and childrens gocarts are old. Those folding constructions have invariably utilized complex linkages which caused them to get out of order easily, and yet were too complex for ordinary use by most housewives. Simplified forms of foldable vehicles suitable for use as trailers adapted to carry loads weighing several hundred pounds, and yet which are light enough to be lifted and carried by one person, have been completely missing from the vehicle field. Hunters and fishermen have lacked a lightweight foldable trailer which could be either drawn or carried to the motoring destination, and then used to transport fishing or hunting equipment to and from an inland lake or camp ground, as well as to bring deer or other big game to camp after same has been shot. It was a recognition of the shortcomings of the trailer art in this field and the need of a lightweight, simplified construction, foldable trailer, which lead to the conception and development of the present invention.

Accordingly, among the objects of the present invention is the provision of a two wheeled, lightweight foldable trailer adapted to be stored by folding and hanging out of the way on a garage wall or the like.

Another object is to provide a foldable trailer which may be quickly shifted from a wide but short trailer adapted for towing behind an automobile to a long but narrow trailer particularly adapted for manual pulling through woods or brush where the open spaces are too narrow for the passage of an ordinary trailer.

Another object is to provide the foldable trailer which may be quickly shifted from wide to narrow, and vice versa, with a foldable brace type of tongue adapted to be quickly mounted and dismounted for use with the trailer in either position.

Another object is to provide the underface of the trailer with a channel member which opens downward and extends lengthwise thereof, and a second channel member which opens downward and extends crosswise thereof.

Another object is to mount a pair of stub axles on the opposite ends of either of the channel members, said stub axles being adapted to carry the supporting wheels.

Another object is to mount the stub axles so as to facilitate moving same from one channel member to the other as well as to permit the wheels, while mounted on the stub axles, to be folded under the trailer for storage or carrying purposes.

A further object is to provide means for locking the stub axles in the channel member, on which they are mounted, in extended position with the wheels in unfolded position and the assembly ready for towing.

A further object is to provide a foldable trailer where the frame does not fold, but the wheels are mounted on stub axles which are pivoted so that the wheels can be swung from side or towing position to under or storage position.

A further object is to provide a wheeled type of foldable trailer which is of simple form, positive in operation, easy to construct, durable, and which may be mounted on skis if desired.

Still further objects and advtanges of the invention will appear as the description proceeds.

To the accomplishment of the foregoing and related ends, the invention, then, consists of the means hereinafter fully described and particularly pointed out in the claims, the annexed drawings and the following description setting forth in detail certain means for carrying out the invention, such disclosed means illustrating, however, but several of the various ways in which the principle of the invention may be used.

In the annexed drawings:

Figure 1 is a top view of a preferred form of the present invention assembled for towing in its wide form.

Figure 2 is a longitudinal sectional view of the assembly taken at line 2—2 of Figure 1 looking in the direction of the arrows.

Figure 3 is a fragmentary sectional view showing the manner of folding one of the stub axles and wheel assemblies, said view being taken at line 3—3 of Figure 1 looking in the direction of the arrows.

Figure 4 is a vertical, substantially center section, view of another form of the present invention mounted on skis and assembled for hand towing in its long narrow form.

Figure 5 is a fragmentary bottom view of the hand grip end of the towing handle illustrated in the assembly shown in Figure 4.

While the foldable trailer of the present invention has been illustrated in the forms especially suitable for use by hunters and fishermen for transporting their equipment, boat, game, or the like, it is equally useful for transporting light loads of rubbish, fertilizer, feed, fuel, or other material which commonly requires handling at home. The trailer being of exceptionally lightweight, and foldable, as well as having a readily dismountable handle, makes it easy to store the trailer in out of the way places during the intervals between use, and at the same time its lightness makes the license fee almost negligible.

Referring more particularly to Figures 1 and 2 of the drawings, it will be noted that the vehicle of the present invention has a frame 1 which may be made of any suitable material although in preferred construction, same is made from angle iron with the corners mitered as shown and then welded. With one flange of the angle iron frame turned upward and the other turned inward, it facilitates placing a bottom panel 2, Figure 3, on the assembly where it can be easily anchored to form a flat deck trailer. Moounted on the under side of frame 1 is a main channel 3 which has its side flanges turned downward. While the main channel is preferably centrally located and welded to frame 1 at both ends, the whole assembly may be strengthened and made more rigid by welding gusset plates 4 and 5 to both the edge of frame 1 and the top of main channel 3. A downturned flange cross channel 6 is preferably centrally located and mounted on, as well as joined to, frame 1 at right angles to main channel 3. While cross channel 6 may be mounted in the assembly in various ways, a preferred construction involves cutting same into two pieces and butting their adjacent ends against the opposite sides of main channel 3 with the cross channel welded both to frame 1 and to the sides of the main channel. Gusset plates 7 and 8 are preferably welded to both the edge of frame 1 and the top of cross channel 6 to strengthen same and make a thoroughly rigid and satisfactory connection. A center gusset plate 9 may be placed over the junction of cross channel 6 and main channel 3 and welded in place so as to not only strengthen the assembly and hold it rigidly together, but also to supply a center support on which a bottom panel 2 may rest. This center gusset plate is of substantially the same thickness as gussets 4, 5, 7, and 8 which in turn are preferably of the same thickness as the inturned flange of angle iron frame 1.

Wheels 10 may be of any suitable construction, but for lightness and strength bicycle wheels with balloon type pneumatic tires 11 are preferably used. These tires act to absorb part of the shocks incurred under towing conditions, and in doing so facilitate constructing the vehicle so as to eliminate the requirement of springs in the final assembly which may be readily towed at moderate rates of speed.

Where a two wheeled trailer is involved, as shown, each of the wheels 10 is preferably mounted on its own stub shaft 12, this stub shaft being of conventional construction suitable for that purpose. A nut 13 is used to lock the wheel in place and a cotter pin 14 holds the nut in adjusted position so that the wheel cannot come off. Each of these stub shafts is of a size which closely fits the hollow of main channel 3, and in preferred construction this stub shaft is relatively short with its inner end pivotally mounted on a bolt 15 or the like. This permits the stub shaft and wheel to be folded under the frame of the assembly as is shown in dotted lines in Figure 3. In this connection it is to be noted that the shorter the stub shaft 12 is made, the closer wheel 10 will fold to the under side of the assembly. However, the stub shaft should be of a sufficient length to permit a strong mounting which will stand considerable shock under conditions of use while the trailer assembly is being towed. In order to lock the stub shaft in the unfolded position, main channel 3 may be provided with a cross drilled opening 16, Figure 3, in alignment with opening 17 in stub shaft 12. Bolt 18, Figure 1, may be passed through the aligned openings 16 and 17 to hold the stub shaft firmly in place, and yet facilitate unfolding of the assembly for storage or the like when bolt 18 is removed.

In Figures 1 and 2, stub shafts 12 are shown as mounted on the ends of the main channel 3 so that the vehicle is of the wide but short type, with the wheels preferably spaced apart so as to follow in the tracks of the towing vehicle (not shown). In some cases, however, it is desirable to have a long but narrow vehicle such, for instance, as where supplies, game, or the like have to be hauled through woods and brush where a standard width trailer either would not go or would cause unnecessary difficulty. Where such is the situation, bolts 15 and 18 may be removed and the stub shafts mounted in identically the same manner on the ends of cross channel 6. Under these conditions, the frame 1 and wheels will take the position shown in Figure 4.

For towing the vehicle, it may be provided with a tongue 19 of suitable length. A preferred form of this tongue may be made from a pair of angle irons 35 and 36 bent to the general shape shown in Figures 1 and 2 with the free end of the tongue provided with a conventional towing connection 20. If desired, a spacer 21 may be fastened in conventional manner between the two channels of the tongue 19 as shown in Figure 1. These two channels at the vehicle frame end are preferably spaced apart a distance equal to the width of channels 3 and 6. The tongue is bolted to the cross channel 6, for instance, as shown in Figures 1 and 2, by means of bolts 22. These bolts may be placed at any desired point, but for convenience the same holes through the channels as are used for mounting the stub shafts may be used in connection with fastening the tongue in place. In order to brace the tongue, a pair of downturned flange angle iron braces 23 and 24, Figure 1, are fastened to tongue 19 by means of bolts 25, while the other end of each of the braces are fastened to frame 1 by means of bolts 26.

When it is desired to change the trailer from wide and short to long and narrow, the tongue is unfastened and removed, following which the stub shafts are shifted from the wide and short position to the long and narrow position, whereupon the tongue may be mounted as described on the end of main channel 3 with braces 23 and 24 extending to the frame and anchored as before. If these braces are not made of a length which will utilize the same holes in frame 1 for bolts 26, when shifted from one position to the other, then a set of suitably located supplemental holes 27 may be provided for use in anchoring braces 23 and 24 after shifting the tongue.

In some cases, it may be desirable to have a special tongue 19a, Figure 4, which is better suited for hand pulling of the assembly. That tongue would bolt onto either main channel 3 or cross channel 6 the same as towing tongue 19. In preferred construction, the free end of tongue 19a will be provided with a hand gripping member 28 of fork shape with a spool member 29 at the free end thereof. This spool member may be made of a length suitable for gripping with two hands side by side, thus facilitating two people pulling the vehicle at the same time.

While wheels for the vehicle are suitable for most conditions, still in the winter time when there is snow on the ground, runners are commonly desirable for off road use. A simple construction for meeting such conditions is shown in Figure 4, where a double ended runner 30 for each wheel is provided on its upper face with a cradle assembly 31 which has a multiplicity of U-shaped members 32 on its upper face adapted to receive and closely fit tire 11 on wheel 10. At least two of these U-shaped members 32 will be provided with straps 33, or the equivalent, for anchoring the wheel onto the cradle assembly. With this construction, the field of use of the vehicle, as a whole, is considerably extended.

While a load may be tied or otherwise fastened onto the vehicle in any conventional manner, the frame 1 may, if desired, be provided with clips 34 on which straps of conventional type (not shown), and having a suitable clip end, may be hooked to facilitate anchoring a load on the trailer assembly.

Other modes of applying the principle of our invention may be employed instead of those explained, change being made as regards the vehicle herein disclosed, provided the means stated by any of the following claims or the equivalent of such stated means be employed.

We therefore particularly point out and distinctly claim as our invention:

1. In a foldable vehicle of the two wheel type, the combination of a frame, a downturned main channel member and a downturned channel member crossing the main channel member on the under face of said frame, a pair of stub axle shifts, a wheel on the outer end of each stub axle shaft and means for pivotally mounting said stub shafts on either of said channels whereby said wheels may be folded to occupy positions beneath the frame.

2. In a foldable vehicle of the two wheel type, the combination of a frame which is longer than it is wide, a downturned main channel member extending lengthwise of the under side of said frame, a downturned cross channel member extending crosswise of the under side of said frame, a pair of stub axle shafts one end of each having a cross section closely fitting the hollow of either of said channels, a wheel on the other end of each stub axle shaft and means for pivotally mounting that end of said stub shafts direct on either of said channels in the hollow of same at the opposite ends thereof whereby said wheels may be folded to occupy positions beneath the frame.

3. In a foldable vehicle of the two wheel type, the combination of a frame which is longer than it is wide and which has a downturned main channel member and a downturned cross channel member mounted on the under face thereof, said main channel member extending lengthwise of said frame and said cross channel member substantially at right angles to said main channel, a pair of stub axle shafts, a wheel on the outer end of each stub axle shaft, means for pivotally mounting that end of said stub shafts direct on opposite ends of either of said channels whereby said wheels may be folded to occupy positions beneath the frame, and means for releaseably anchoring said stub shafts against pivotal movement in said channel.

4. In a foldable vehicle, as in claim 3 wherein a tongue is mounted on an edge of said frame which connects the edges of said frame carrying said stub shafts.

5. In a foldable vehicle, the combination of a rectangular frame, a downturned main channel member and a downturned channel member mounted on the under face of said frame and crossing the main channel member, a pair of stub axle shafts, means for pivotally mounting said stub axle shafts opposite each other direct on either one of said channels and at opposite edges of said frame, a tongue, and means for mounting said tongue on an edge of said frame which connects the edges of said frame from which said stub shafts project.

6. A foldable two wheeled vehicle, which comprises the combination of a frame which is longer than it is wide, a downturned main channel and a downturned cross channel mounted on the under face of said frame, said main channel member extending lengthwise of said frame and said cross channel crosswise of said frame and substantially perpendicular to said main channel, a pair of stub axle shafts, each having a wheel mounted on one end thereof, means for pivotally mounting the other end of each of said stub shafts direct to said side flanges in the opposite ends of either of said channels, a tongue, and means for mounting said tongue on the channel extending sidewise from the one carrying said stub axles.

7. A foldable two wheeled vehicle, which consists of the combination of a frame which is longer than it is wide, a downturned main channel and a downturned cross channel mounted on the under face of said frame, said main channel member extending lengthwise of said frame and said cross channel crosswise of said frame and substantially perpendicular to said main channel, a pair of stub axle shafts, each having a wheel mounted on one end thereof, means for pivotally mounting the other end of each of said stub shafts direct to the side flanges in the opposite ends of either of said channels, both means for releaseably anchoring said stub shafts to the side flanges of said channel to hold them against pivotal movement, a tongue, and means for mounting said tongue on the channel extending sidewise from the one carrying said stub axles.

JOHN J. BANASZAK.
WALTER J. BANASZAK.

REFERENCES CITED

The following references are of record in the file of this patent:

UNITED STATES PATENTS

| Number | Name | Date |
| --- | --- | --- |
| 1,238,524 | Kennedy | Aug. 28, 1917 |
| 1,319,235 | Messersmith | Oct. 21, 1919 |
| 2,419,445 | Fletcher | Apr. 22, 1947 |